US006876702B1

(12) United States Patent
Hui et al.

(10) Patent No.: US 6,876,702 B1
(45) Date of Patent: Apr. 5, 2005

(54) MOTION VECTOR DETECTION WITH LOCAL MOTION ESTIMATOR

(75) Inventors: Yau Wai Lucas Hui, Singapore (SG); Hong Lye Oh, Singapore (SG); Jean-Michel Bard, Crolles (FR)

(73) Assignee: STMicroelectronics Asia Pacific (Pte) Ltd., Singapore (SG)

(*) Notice: Subject to any disclaimer, the term of this patent is extended or adjusted under 35 U.S.C. 154(b) by 0 days.

(21) Appl. No.: 09/807,497

(22) PCT Filed: Oct. 13, 1998

(86) PCT No.: PCT/SG98/00085

§ 371 (c)(1),
(2), (4) Date: Jul. 9, 2001

(87) PCT Pub. No.: WO00/22833

PCT Pub. Date: Apr. 20, 2000

(51) Int. Cl.[7] ............................................. H04N 7/12
(52) U.S. Cl. ................................................ 375/240.16
(58) Field of Search ........................ 375/240.12, 240.16; 348/402.1, 407.1, 413.1, 416.1, 699, 700; H04N 7/12

(56) References Cited

U.S. PATENT DOCUMENTS

| 5,473,379 | A | | 12/1995 | Horne |
| 5,526,053 | A | * | 6/1996 | Dorricott et al. ............ 348/443 |
| 5,657,087 | A | | 8/1997 | Jeong et al. |
| 5,717,441 | A | | 2/1998 | Serizawa et al. |
| 5,786,860 | A | | 7/1998 | Kim et al. |
| 5,801,778 | A | * | 9/1998 | Ju ........................... 375/240.15 |
| 5,872,604 | A | | 2/1999 | Ogura |
| 5,883,674 | A | | 3/1999 | Ogura |
| 6,014,181 | A | * | 1/2000 | Sun ............................. 348/699 |
| 6,256,343 | B1 | * | 7/2001 | Suzuki ........................ 375/240 |
| 6,295,377 | B1 | * | 9/2001 | Dufaux et al. .............. 382/236 |
| 6,310,920 | B1 | * | 10/2001 | Ogawa .................. 375/240.17 |

FOREIGN PATENT DOCUMENTS

| EP | 0652678 A2 | 5/1995 |
| EP | 0831642 A2 | 3/1998 |
| EP | 0866619 A2 | 9/1998 |

OTHER PUBLICATIONS

Test Model Editing Committee, "Test Model 5," *International Organization for Standarisation Organisation Internationale De Normalization ISO–IEC/JTC1/SC29/WG11 Coded Representation of Picture and Audio Information 2*: 1–58, Apr. 1993.

* cited by examiner

*Primary Examiner*—Nhon Diep
(74) *Attorney, Agent, or Firm*—Lisa K. Jorgenson; Robert Iannucci; Seed IP Law Group PLLC (57) ABSTRACT

A method and apparatus of encoding digital video, for example according to the ISO/IEC MPEG standards (ISO/IEC 11172-2 MPEG-1 and ISO/IEC 13818-2 MPEG-2), which employs a local motion estimator for determining respective local motion vectors for groups of adjacent macroblocks in a picture. A local motion vector is determined for each row of macroblocks in a picture from the motion vectors of the macroblocks in that row. Then, for macroblocks in the corresponding row of a subsequently coded picture, the local motion vector can be used to select the search window used for determining the motion vectors. The local motion estimator improves search range and accuracy of macroblock motion vector detection without increasing the search window accessing bandwidth and caching requirement, and computation lode of searching.

20 Claims, 3 Drawing Sheets

MOTION VECTOR DETECTION WITH LOCAL MOTION ESTIMATOR

FIELD OF THE INVENTION

The present invention relates to a method and apparatus for encoding moving pictures sequences. In particular, the present invention relates to a method and apparatus for motion estimation and motion compensation in a video signal compression system.

BACKGROUND OF THE INVENTION

Methods for encoding moving pictures or video such as the MPEG1, MPEG2, H.261, and H.263 standards had been developed for efficient transmission and storage. A detailed description of one such encoding method is found in MPEG2 Test Model 5, ISO/IEC JTC1/SC29/WG11/N0400, April 1993, and the disclosure of that document is hereby expressly incorporated herein by reference. In the described encoding method, an input video sequence is organized into a sequence layer, group-of-pictures (GOP), pictures, slices, macroblocks, and finally block layer. Each picture is coded according to its determined picture coding type. The picture coding types used include intra-coded picture (I-picture), predictive-coded picture (P-picture), and bi-directionally predictive-coded picture (B-picture).

Motion estimation/compensation, transform coding, and statistical coding are utilized to efficiently compress the input video sequence. For example in MPEG2 Test Model 5, each picture from the input video sequence is partitioned into rows of smaller and non-overlapping macroblocks of picture elements (pixels). Macroblocks in each row may be grouped into one or more slices. The compression is performed on each macroblock on a row-by-row basis starting from the leftmost macroblock to the rightmost macroblock, and the top row to the bottom row.

In the motion estimation/compensation method, motion vectors are detected for each macroblock in a picture. The coding mode for a macroblock (e.g. intra-coded, forward-predicted, backward-predicted, or interpolated) is decided based on the detected motion vectors and the determined picture coding type. The utilized motion vectors are differentially coded with variable length codes before outputting.

A typical motion vector detection process comprises determining, for each macroblock to be coded, a search window consisting of pixels from a reference picture and matching pixel vales of the macroblocks to blocks of pixel values obtained from the search window. This process is known to be computationally intensive. Particularly, the size of the search window has a direct impact to the computation load.

Many methods of matching the pixel blocks are available, such as an exhaustive, search method which compares every definable block within the search window, a logarithmic search method, a hierarchial search, and various other possible derivations. Depending on application requirements, a search method may be selected based on its performance in terms of accuracy and computation complexity.

To cater for sequences with large object movements between pictures, methods exist to increase the search range without enlarging the search window. These methods provide greater accuracy motion vectors for picture sequences with large movements without a large increase in computation load. One such method is the telescopic search method in which the motion vectors of macroblocks from a previously coded or matched picture are used to generate a new search window for each current macroblock. The telescopic search method comprises the steps of obtaining a motion vector from a co-sited macroblock from a closest coded picture; optional scaling of the obtained motion vector according to the picture distances between the reference picture, the closest coded picture, aid the current picture; and defining the search window based on the centre position of the current macroblock plus an offset defined by the scaled motion vector.

Alternate methods of determining search windows are disclosed in U.S. Pat. Nos. 5,473,379 and 5,657,087, for example. The methods disclosed therein comprise the steps of calculating a global motion vector based on the motion vectors of a previous picture, and offsetting search windows of all macroblocks by the calculated global motion vector. The global motion vector may be determined by the mean or the media function, or by the most common motion vector of the previous picture; it can be further normalized according to the picture distances. The calculated global motion vector may then represent a global translational motion of objects from one picture to the other.

Apparatus implementing the motion estimator may include a search engine for performing the comparison of the current macroblock pixels with candidate pixel blocks from the search window. An example implementation of a suitable search engine is a systolic array processor which calculates and compares sum of absolute difference of the current macroblock with all candidate blocks. A search window cache is coupled with the search engine to sustain the large input data bandwidth requirement of the search engine. The search window cache is updated via a DMA with the new search window for each macroblock from a slower but larger frame memory where the reference picture is stored. A programmable or fixed function controller with necessary RAM or ROM is used to determine the search windows, control DMA update of the cache with the search window, as well as monitor the search engine for resulting motion vectors.

To minimize the bandwidth between the cache and frame memory, the search window cache is designed to maximize the overlapping area of one search window and the next. As a row of macroblocks is processed from the left to right, only the rightmost part of the search window for each macroblock is loaded into the search window cache.

In some instances the amount of picture motion from one frame to another can be very large, particularly when the reference picture is two or more frames separated in sequence from the object picture. However, increasing the size of the search window to better match the large amount of motion would escalate the implementation complexity and power consumption.

The aforementioned telescopic search method expands the possible search range by redefining the search window location for each macroblock. This method faces problems in picture regions with un-correlated motion wherein the search window has to be enlarged to account for the incorrectly defined search window location. In terms of implementation, the expanded possible search range increases the search window cache size requirement and also the bandwidth requirement between the search window cache and the frame memory. This is so because the search window cache has to store data of all possible locations of search window for the next macroblock.

Methods utilizing the global motion vector such as disclosed in U.S. Pat. Nos. 5,473,379 and 5,657,087 may be used to minimize the search window cache size as well as the bandwidth requirement from the frame memory while expanding the actual search range. These methods fix the offset of the search window for all macroblocks in a picture. However, given that the only a single global motion vector is used to offset all of the macroblock search windows, the search range expansion works well only with pictures containing uniform translational motion. Pictures with morning, rotational motion, and shearing effects, for example, are not well dealt with using this technique.

Finally, all of the detected and utilized motion vectors are differentially coded with variable length codes (VLC) to reduce the coding bit rate. Expanding the search range may produce larger motion vectors which require bigger VLC tables to be selected at the picture level to code the motion vectors. In turn, the bit rate for motion vector coding is increased.

SUMMARY OF THE INVENTION

In accordance with the present invention, there is provided a meth id for determining motion vectors for encoding picture data in a sequence of pictures wherein data representing a picture in the sequence is arranged in a plurality of adjacent data blocks, the method comprising the steps of:

(a) encoding a first picture in the sequence with motion vectors for the data blocks in the first picture;

(b) generating respective local motion vectors for groups of adjacent data blocks in the first picture, wherein a local motion vector for each group of data blocks is generated according to the individual motion vectors of the data blocks in the group;

(c) selecting a data block of an object picture to be coded;

(d) determining a window of search data from a reference picture on the basis of the corresponding position of the selected data block and the local motion vector which corresponds to the selected data block; and (e) comparing the selected data block with the search data from the reference picture in order to determine a motion vector for the selected data block.

The present invention also provides a moving pictures encoder for encoding a sequence of pictures, including: a motion vector detector coupled to receive picture data from the sequence of pictures for determining respective motion vectors for data blocks in a picture of the picture sequence, wherein each motion vector is determined using a comparison of the data block with search window data from a reference picture; a local motion estimator coupled to the motion vector detector for determining and storing a local motion vector based on motion vectors from a group of adjacent data blocks from a picture; and wherein the motion vector detector utilises stored local motion vectors from a previously coded picture to determine the search window data.

The present invention further provides a coding apparatus for encoding picture data in a sequence of pictures wherein data representing a picture in the sequence is arranged in a plurality of adjacent data blocks and motion vectors are generated for the data blocks of a picture in the sequence, the coding apparatus including:

a local motion estimator for generating respective local motion vectors for groups of adjacent data blocks in the object picture, wherein a local motion vector for each group of data blocks is generated according to individual motion vectors of the data blocks in the group;

a local motion vector storage memory for storing the local motion vectors for the object picture; and a motion vector detector for generating motion vectors for data blocks in an object picture, the motion vector detector including a search window cache for caching a selected portion of a reference picture and a search engine for comparing data blocks of the object picture with the search window cache contents, wherein the contents of the search window cache are selected according to a local motion vector retrieved from the local motion vector storage memory from a previously coded picture in the picture sequence.

An embodiment of the present invention utilizes a local motion estimator which determines a local motion vector for each row of macroblocks in a picture to be coded. The local motion estimator may determine the local motion vectors based on detected motion vectors from the corresponding macroblock rows of a previously processed or coded picture. Each determined local motion vector provides an offset for search windows of all macroblocks in a given row. The local motion vectors better adapt to motion variations within a picture, and enable expansion of the effective search range of the motion estimator without increasing the search window size.

In the preferred embodiment, each local motion vector defines a fixed offset to all search windows within a macroblock row, and therefore the amounts of caching and cache updating remain constant from one macroblock to the next within the row given that the search window size is also fixed. This is particularly advantageous because the cache size as well as the cache update bandwidth requirements are the highest at this point. Due to reduced search window sizes for macroblocks near the leftmost and rightmost sides of the row, the caching and cache update bandwidth requirements are reduced on the average when the motion estimation process is moving from one macroblock row to the next. Therefore, the cache size and the cache update bandwidth requirements can be optimized based on only the search window size itself.

In addition, a maximum offset vector can be found with the determined set of local motion vectors for a picture to be coded. The maximum offset vector may be the maximum of absolute values of the horizontal and vertical components from the set of local motion vectors. Combining maximum offset vector and the search window size, the maximum possible motion vector size is determined and therefore a corresponding VLC table can be selected for coding of motion vectors for the picture. In this case, the selection of VLC tables which are optimized for different maximum possible motion vectors can be made adaptive according to the amount of motion from picture to picture.

A picture sequence encoder according to an embodiment of the present invention encodes each input picture by determining its picture coding type (I-, P-, or B-picture), obtaining macroblocks from the picture, subjecting macroblocks of P-picture or B-picture to a motion vector detection process (frame and/or field, forward and/or backward) using a local motion estimator, performing necessary motion compensation (predicted or interpolated) using the detected motion vectors, subjecting all macroblocks to a transform coder followed by a statistical coder. The local motion estimator is updated with motion vectors from past processed pictures by the motion vector detector. The motion vectors are used to generate a local motion vector for each row of macroblocks in a new picture to be coded. Generated local motion vectors are used to offset search windows of all macroblocks in the corresponding macroblock row.

Embodiments of the present invention are able to provide an improved picture sequence encoding method or apparatus containing a motion estimator with an expanded search range and a minimized search window. Further, embodiments of the invention can provide an apparatus for encoding a picture sequence which includes a motion estimator with optimized search window cache size and frame buffer memory bandwidth requirements. The embodiments of the invention described herein therefore enable an efficient method for motion vectors coding.

BRIEF DESCRIPTION OF THE DRAWINGS

The invention is described in greater detail hereinafter, by way of example only, through the following description of preferred embodiments thereof and with reference to the accompanying drawings, wherein.

DETAILED DESCRIPTION OF THE PREFERRED EMBODIMENTS

Figure 1:
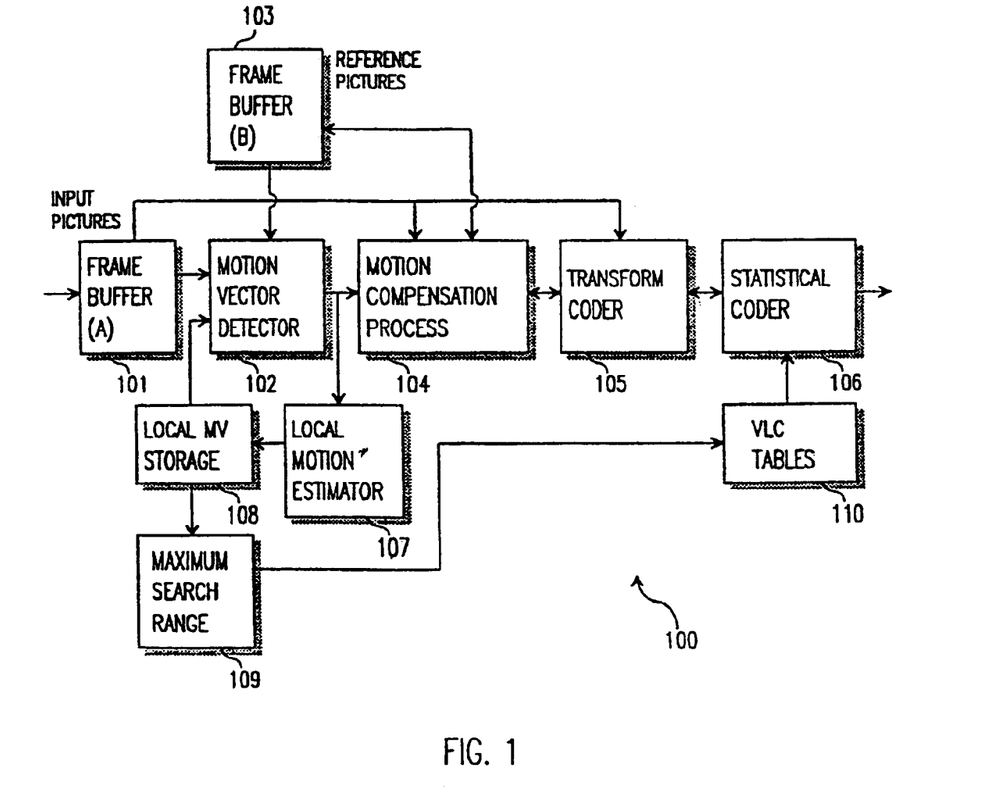
FIG. 1 is a functional block diagram of a video encoder with a local motion estimator according to one embodiment of the present invention.

A block diagram of a picture sequence encoder according to a preferred embodiment of the present invention is illustrated in FIG. 1. A moving pictures sequence, which may be in the form of video signals, is input to a frame buffer (A) 101 for re-ordering and processing requirements (eg. raster to macroblock conversion). The moving pictures sequence may be pre-processed before inputting. Useful pre-processing techniques may include noise reduction, inverse telecine, and chroma subsampling.

A picture coding type (I, P, or B-picture) is determined using known methods according to application needs for each picture in the input picture sequence. An I-picture is an intra-coded picture used mainly for random access or scene update, a P-picture uses forward motion predictive coding with reference to a previously coded I or P-picture (anchor picture), and a B-picture uses forward and backward motion predictive/interpolative coding with reference to previously coded I and/or P-pictures. An input pictures sequence may be either a field or frame structured sequence coming from an interlaced or progressive source.

Macroblocks containing blocks of pixel values are derived from a picture to be coded from picture data stored in the frame buffer (A) 101. The macroblocks are derived on a row by row basis starting from the leftmost macroblock to the rightmost macroblock, and the top row to the bottom row. Macroblocks belonging to an I-picture are passed directly to a transform coder 105, whilst macroblocks belonging to a P-picture or B-picture are passed to a motion vector detector 102. It is also possible to subject macroblocks belonging to an I-picture to the motion vector detector 102 for generation of error concealment motion vectors such as defined in the MPEG 2 standard.

All necessary motion vectors, for example the frame and/or field, forward and/or backward, and 16×16/16×8/8×8 motion vectors, of each macroblock are detected by the motion vector detector 102 by matching the macroblock to candidate blocks obtained from a search window obtained from a reference picture stored in a frame buffer (B) 103. Different matching methods such as the exhaustive search method, the logarithmic search method, multi-steps or hierarchical search method, and search window sizes may be utilized in the motion vector detector 102 depending on application as well as implementation needs. Matching methods may also be implemented in various pixel resolutions for example integer, half pel or quarter pel resolution. The matching criterion may be based on minimum of absolute errors, square errors, or other suitable distortion functions. In addition, methods of checking neighbouring macroblock motion vector correlation may be applied. Details of various described matching methods and matching criterion which can be utilised in conjunction with embodiments of the present invention are well known or will be readily apparent to one skilled in the art.

The motion vector detector 102 is coupled to a motion compensation processor 104. In the motion compensation process 104, a macroblock coding mode which can be intra-coded, frame/field forward/backward predicted, or frame/field interpolated is first decided for each macroblock based on the detected motion vectors from the motion vector detector 102. Any necessary prediction errors are then generated based on the decided macroblock coding mode. An example macroblock coding mode decision method may be found in the MPEG2 Test Model 5 specification.

Resultant macroblocks from the motion compensation process 104 are subjected to a transform coder 105 which exploits correlation within each macroblock and also its psycho-visual effects. Examples of popular transform coders may be found in the MPEG1, MPEG2, H.261, and H.263 standards. One embodiment of a transform coder 105 according to the MPEG2 Test Model 5 includes discrete cosine transformation (DCT), a quantizer, rate controller with adaptive quantization, inverse quantizer, and inverse DCT. The transform coder 105 produces transformed and quantized coefficients for each macroblock which are then subjected to a statistical coder 106. In addition, the transformed and quantized coefficients are inverse quantized and inverse transformed by the transform coder 105 to produce reconstructed macroblocks. Before storing the reconstructed macroblocks to the frame buffer (B) 103 for future reference, any necessary inverse of motion compensation is provided to each reconstructed macroblock by the motion compensation process 104. Reference pictures are formed by the reconstructed macroblocks for use in the motion vector detector 102 and motion compensation process 104. In some applications or coding instances, input pictures can be taken directly as reference pictures for motion vector detector 102.

The statistical coder 106 exploits all statistical redundancies in the received data, and multiplexes the results to produce the final compressed output bitstream. As an example in the MPEG2 Test Model 5, the statistical coder 106 provides the zig-zag scanning and run-length encoding of the transformed and quantized coefficients, differential coding of the utilized motion vectors, and multiplexing of all results and necessary side information (eg. sequence/GOP/picture/slice/macroblock layer header information, picture coding types, macroblock coding modes, etc). The statistical coder 106 utilizes variable length codes (VLC) from VLC tables 110.

A local motion estimator 107 determines a local motion vector for each row of macroblocks from an input picture. In an embodiment of the local motion estimator 107, motion vectors from a same macroblock row of a picture as detected by the motion vector detector 102 are averaged to generate the local motion vector for the corresponding macroblock row of a new input picture. Alternatively, the median motion vector or the most common vector may be selected, instead of the average, to be output local motion vector. Further methods of generating the local motion vector of each macroblock row according to the present invention are possible with motion vectors from neighbouring (top or bottom or additionally neighbour picture) macroblock rows, or with independent row motion detectors; however, there may be little or no implementation advantage for doing so. Each generated local motion vector may be normalized according to the picture distances involved.

Figure 2:
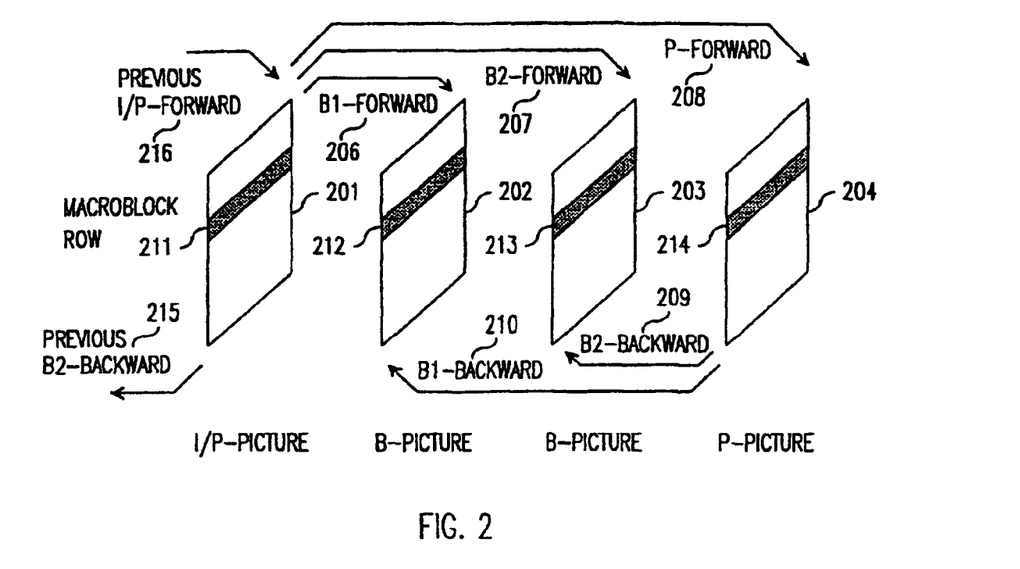
FIG. 2 illustrates forward and backward motion vector detection for B-pictures and P-picture according to the present invention.

FIG. 2 illustrates as an example how local motion vectors (MV) can be generated using results of previous forward and/or backward motion vector detection according to the present invention. In this example, two B-pictures 202 and 203 (B1 and B2 respectively) are in between two anchor I or P-pictures 201 and 204. The pictures are shown in display order representing a small part of an input picture sequence. Forward MV detection is performed for picture 202 (B1), 203 (B2), and 204 (P) represented by B1-Forward 206, B2-Forward 207, and P-Forward 208 respectively. Similarly, backward MV detection is performed for picture 202 (B1) and 203 (B2), and forward MV detection for picture 201 (I/P) with respect to a previous reference picture which is represented by Previous IP-Forward 216. Macroblock rows 211, 212, 213, and 214 represent macroblocks rows of the same vertical position or row number in pictures 201, 202, 203, 204 respectively.

It is preferable that a local MV to be used for future MV detection is generated by motion vectors from a very nearby picture. As an example, a local MV for use in B2-Forward 207 of macroblock row 213 may be generated by motion vectors resulting from B-Forward 206 for row 212. With reference to FIG. 2, the following table summarizes the selection of motion vectors for local MV generation as one out of many possible embodiments of the local motion estimator according to the present invention.

| Local MV for use in: | with Local MV generated by MVS resulted from: |
|---|---|
| B1-Forward 206 | Previous 1/P-Forward 216 or Previous B2-Backward 215 |
| B2-Forward 207 | B1-Forward 206 |
| P-Forward 208 | B2-Forward 207 |
| B2-Backward 209 | B2-Forward 207 or P-Forward 208 |
| B1-Backward 210 | B2-Backward 209 or B1-Forward 206 |

The resulting local motion vectors are stored in a local MV storage 108 illustrated in FIG. 1. When they are available, the local motion vectors are retrieved by the motion vector detector 102 to offset search windows of the corresponding macroblock rows. An optional maximum search range detector 109 may be used according to the present invention to determine the maximum horizontal and vertical search ranges of all motion vectors of a picture such that optimal VLCs can be used from the VLC tables 110 for coding of motion vectors in the statistical coder 106. The maximum search range, independently defined for horizontal and vertical motion, is the maximum range of all local motion vectors for a picture plus the maximum range of the search window for the picture. With the maximum search range detector 109, shorter VLCs or lower bitrate can be used for coding of motion vectors for a sequence of scenes with little motion, and the VLCs and VLC tables are adaptively extended when motion within the sequence or scenes become larger. The maximum search range information may be coded or transmitted at the picture layer. Methods of VLC coding for motion vectors may be found in the MPEG2 standard.

Figure 3:
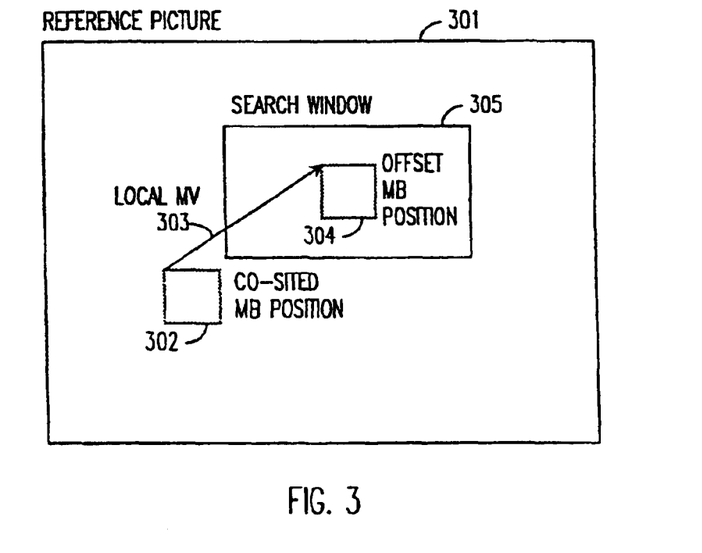
FIG. 3 illustrates how a search window is defined by a local notion vector within a reference picture according to the present invention.

In FIG. 3, the procedure for determination of a search window using a local MV is illustrated. A search window for a current macroblock (MB) to be coded is determined from a reference picture 301 by first determining the position of a co-sited MB 302 on the reference picture 301. The position is then offset by a local motion vector 303 generated for the macroblock row where the current MV belongs to a new offset MB position 304 as illustrated. Finally, the horizontal and vertical search ranges are included centred around the offset MB position 304 to form the search window 305 for the current MB. The search window 305 is then used for motion vector detection for the current MB.

Figure 4:
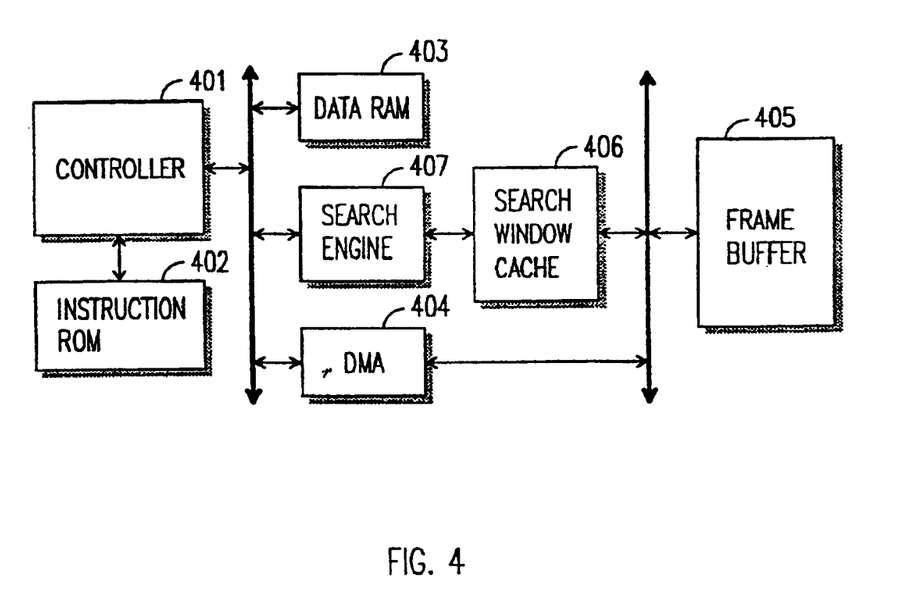
FIG. 4 shows a block diagram of a circuit for implementing the motion vector detector and local motion estimator as part of a moving pictures encoding system apparatus according to an embodiment of the present invention.

FIG. 4 shows a block diagram of a circuit which can be employed for implementing the motion vector detector and local motion estimator as part of a moving pictures encoding system apparatus according to an embodiment of the present invention. Typically the input picture and reference picture are stored in a large frame buffer 405 which may be implemented using DRAM (dynamic random access memory). A controller 401, which can be a microprocessor, a digital signal processor (DSP), or a fixed function sequencer, is used to control a DMA (direct memory access controller) 404 for accessing the frame buffer 405. Instruction codes needed for the controller 401 can be stored in an instruction ROM (read only memory) 402.

A current MB to be coded is determined and loaded into a search engine 407 by the controller 401 and DMA 404. The controller then obtains a previously determined local motion vector for the corresponding macroblock row from data in a RAM 403. Using the determined local motion vector, the controller defines a search window and transfers the corresponding data from a reference picture stored in the frame buffer 405 to a search window cache 406 using the DMA 404. Given that one local motion vector is used for the whole macroblock row and that the search window size is fixed according to application or implementation needs, for subsequent MBs only a fraction of the defined search window must be loaded into the search window cache 406. The rest of the defined search window overlaps the search window of the previous MB and therefore is already stored in the search window cache 406.

With the current MB, the search engine 407 performs motion vector detection based on the search window data in the search window cache 406. The search engine 407 may be implemented to perform specific search methods such as the exhaustive search method or the multi-steps/multi-resolution hierarchical search methods, or specific search criterion such as using minimum sum of square errors or absolute errors. A systolic array processor architecture may be used in the search engine 407 to the meet the computation power requirements. The search engine 407 provides as output all detected motion vectors to the controller 401. In addition, the results of search criterion computation (minimum square errors, absolute errors, etc) may be provided for macroblock coding mode decision processes. At the end of a row, the controller 401 determines a local motion vector using the output motion vectors for each macroblock row and stores the local motion vector into data RAM 403 for future use.

It will be appreciated from the foregoing description that embodiments of the present invention provide an improved method and apparatus for motion vector detection. A local motion estimator is used to better predict picture to picture motion which consists of not just translation motion, but also zoom, sheer, or split screen motion. The better prediction or picture to picture motion allows smaller search windows to be used to calculate individual macroblock motion vectors, and therefore enables a reduction of computation load and implementation complexity. With a fixed local motion vector (fixed offset) for each macroblock row, the search window cache size can be minimized according to only the search window size. Furthermore, the updating of the search window cache is also minimized and hence a reduction of memory access bandwidth. These results provide additional reduction in implementation complexity.

The present invention optionally allows maximum horizontal and vertical motion search ranges to be adaptively determined using the local motion vectors. This method provides an efficient way of coding motion vectors using variable length codes. Sequences or scenes with little motion are better coded with motion vector bitrate reduction, whilst on the other hand, motion vector bitrate is increased to handle larger motion within sequence or scenes.

The foregoing detailed description of the embodiments of the present invention has been presented by way of example only, and is not intended to be considered limiting to the invention as defined in the claims appended hereto.

What is claimed is:

1. A method for determining motion vectors for encoding picture data in a sequence of pictures wherein data representing a picture in the sequence is arranged in a plurality of adjacent data blocks; the method comprising the steps of:
   (a) encoding a first picture in the sequence with motion vectors for the data blocks in the first picture;
   (b) generating respective local motion vectors for groups of adjacent data blocks in the first picture, wherein a local motion vector for each group of data blocks is generated according to the individual motion vectors of the data blocks in the group;
   (c) selecting a data block of an object picture to be coded;
   (d) determining a window of search data from a reference picture on the basis of the corresponding position of the selected data block and the local motion vector which corresponds to the selected data block;
   (e) comparing the selected data block with the search data from the reference picture in order to determine a motion vector for the selected data block; and
   repeating the steps (c), (d) and (e) for each data block in a group of adjacent data blocks in the object picture, wherein the step (e) involves storing the window of search data in a cache memory, and wherein each successive iteration of the step (e) after an initial operation requires only a fraction of the search data window to be cached.

2. A method as claimed in claim 1, including a step (f) of generating a local motion vector from the motion vectors of the data blocks in said group of data blocks in the object picture.

3. A method as claimed in claim 1 or 2, wherein each said group of adjacent data blocks comprises a row of macroblocks from the respective picture.

4. A method as claimed in claim 1, wherein the window of search data is of fixed size for a group of data blocks.

5. A method as claimed in claim 2, including repeating the steps (c) through (f) for each data block and group of data blocks in the object picture.

6. A method as claimed in claim 1 or 2, wherein the local motion vector for a group of data blocks comprises an average of the motion vectors for the data blocks in the group.

7. A method as claimed in claim 1 or 2, wherein the local motion vector for a group of data blocks comprises a median of the motion vectors for the data blocks in the group.

8. A method as claimed in claim 1 or 2, wherein the local motion vector for a group of data blocks comprises a most common value of the motion vectors for the data blocks in the group.

9. A moving pictures encoder for encoding a sequence of pictures, the encoder comprising:
   a motion vector detector coupled to receive picture data from the sequence of pictures for determining respective motion vectors for data blocks in a picture of the picture sequence, wherein each motion vector is determined using a comparison of the data block with search window data from a reference picture;
   a local motion estimator coupled to the motion vector detector for determining and storing a local motion vector based on motion vectors from a group of adjacent data blocks from a picture; and
   wherein the motion vector detector utilizes stored local motion vectors from a previously coded picture to determine the search window data;
   a transform coder and a statistical coder which uses variable length code tables for encoding the motion vectors; and
   a maximum vector analyzer for determining a maximum vector magnitude from the local motion vectors for a picture and selecting a variable length coding table for use by the statistical coder on the basis of the maximum vector magnitude.

10. A moving pictures encoder as claimed in claim 9, wherein the reference picture is stored in a frame buffer memory, the search window data in a search window cache memory, and wherein the motion vector detector is coupled to control transfer of data from the frame buffer memory to the search window cache memory on the basis of stored local motion vectors.

11. A moving pictures encoder as claimed in claim 10, wherein a group of adjacent data blocks utilized by the local motion estimator to determine a local motion vector comprises a row of macroblocks from a picture.

12. A method for determining motion vectors for encoding picture data in a sequence of pictures wherein data representing a picture in the sequence is arranged in a plurality of adjacent data blocks; the method comprising the steps of:
   (a) encoding a first picture in the sequence with motion vectors for the data blocks in the first picture;
   (b) generating respective local motion vectors for groups of adjacent data blocks in the first picture, wherein a local motion vector for each group of data blocks is generated according to the individual motion vectors of the data blocks in the group;
   (c) selecting a data block of an object picture to be coded;
   (d) determining a window of search data from a reference picture on the basis of the corresponding position of the selected data block and the local motion vector which corresponds to the selected data block;
   (e) comparing the selected data block with the search data from the reference picture in order to determine a motion vector for the selected data block;
   repeating the steps (c) through (e) for each data block and group of data blocks in the object picture;
   determining a maximum offset vector based on the maximum of absolute values of horizontal and vertical components of the local motion vectors for the object picture; and selecting a variable length coding table for coding the data block motion vectors for the object picture based on the maximum offset vector.

13. A method as claimed in claim 12, including a step (f) of generating a local motion vector from the motion vectors of the data blocks in said group of data blocks in the object picture, wherein the repeating step includes repeating steps (c) through (f) for each data block and group of data blocks in the object picture.

14. A method for determining motion vectors for encoding picture data in a sequence of pictures wherein data representing a picture in the sequence is arranged in a plurality of adjacent data blocks; the method comprising the steps of:
(a) encoding a first picture in the sequence with motion vectors for the data blocks in the first picture;
(b) generating respective local motion vectors for groups of adjacent data blocks in the first picture, wherein a local motion vector for each group of data blocks is generated according to the individual motion vectors of the data blocks in the group;
(c) selecting a data block of an object picture to be coded;
(d) determining a window of search data from a reference picture on the basis of the corresponding position of the selected data block and the local motion vector which corresponds to the selected data block;
(e) comparing the selected data block with the search data from the reference picture in order to determine a motion vector for the selected data block;
repeating the steps (c) through (e) for each data block and group of data blocks in the object picture, wherein the local motion vectors generated from the object picture are subsequently used for performing step (d) during coding of a successive picture in the sequence of pictures.

15. A method as claimed in claim 14, including a step (f) of generating a local motion vector from the motion vectors of the data blocks in said group of data blocks in the object picture, wherein the repeating step includes repeating steps (c) through (f) for each data block and group of data blocks in the object picture.

16. A coding apparatus for encoding picture data in a sequence of pictures wherein data representing a picture in the sequence is arranged in a plurality of adjacent data blocks and motion vectors are generated for the data blocks of a picture in the sequence, the coding apparatus comprising:
a local motion estimator for generating respective local motion vectors for groups of adjacent data blocks in the object picture, wherein a local motion vector for each group of data blocks is generated according to individual motion vectors of the data blocks in the group;
a local motion vector storage memory for storing the local motion vectors for the object picture; and
a motion vector detector for generating motion vectors for data blocks in an object picture, the motion vector detector including a search window cache for caching a selected portion of a reference picture and a search engine for comparing data blocks of the object picture with the search window cache contents, wherein the contents of the search window cache are selected according to a local motion vector retrieved from the local motion vector storage memory from a previously coded picture in the picture sequence;
a transform coder and a statistical coder which uses variable length code tables for encoding the motion vectors; and a maximum vector analyzer for determining a maximum vector magnitude from the local motion vectors for a picture and selecting a variable length coding table for use by the statistical coder on the basis of the maximum vector magnitude.

17. A coding apparatus as claimed in claim 16, wherein the local motion estimator generates a local motion vector for each row of macroblocks in a picture.

18. A moving pictures encoder for encoding a sequence of pictures, wherein data representing a picture in the sequence is arranged in a plurality of adjacent data blocks; the encoder comprising:
encoding means for encoding a first picture in the sequence with motion vectors for the data blocks in the first picture;
generating means for generating respective local motion vectors for groups of adjacent data blocks in the first picture, wherein a local motion vector for each group of data blocks is generated according to the individual motion vectors of the data blocks in the group;
selecting means for successively selecting each data block of a group of data blocks of an object picture to be coded;
determining means for successively determining, for each selected data block in the group of data blocks, a window of search data from a reference picture based on a corresponding position of the selected data block and the local motion vector which corresponds to the selected data block;
comparing means for successively comparing, for each selected data block in the group of data blocks, the selected data block with the search data from the reference picture in order to determine a motion vector for the selected data block; and
a cache memory that stores the window of search data, wherein each successive comparison by the comparing means after an initial operation requires only a fraction of the search data window to be cached in the cache memory.

19. A moving pictures encoder for encoding a sequence of pictures,
wherein data representing a picture in the sequence is arranged in a plurality of adjacent data blocks; the encoder comprising:
encoding means for encoding a first picture in the sequence with motion vectors for the data blocks in the first picture;
generating means for generating respective local motion vectors for groups of adjacent data blocks in the first picture, wherein a local motion vector for each group of data blocks is generated according to the individual motion vectors of the data blocks in the group;
selecting means for successively selecting each data block of a group of data blocks of an object picture to be coded;
determining means for successively determining, for each selected data block in the group of data blocks, a window of search data from a reference picture based on a corresponding position of the selected data block and the local motion vector which corresponds to the selected data block;
comparing means for successively comparing, for each selected data block in the group of data blocks, the selected data block with the search data from the reference picture in order to determine a motion vector for the selected data block;

means for determining a maximum offset vector based on the maximum of absolute values of horizontal and vertical components of the local motion vectors for the object picture; and means for selecting a variable length coding table for coding the data block motion vectors for the object picture based on the maximum offset vector.

20. A moving pictures encoder for encoding a sequence of pictures, wherein data representing a picture in the sequence is arranged in a plurality of adjacent data blocks; the encoder comprising:

encoding means for encoding a first picture in the sequence with motion vectors for the data blocks in the first picture;

generating means for generating respective local motion vectors for groups of adjacent data blocks in the first picture, wherein a local motion vector for each group of data blocks is generated according to the individual motion vectors of the data blocks in the group;

selecting means for successively selecting each data block of a group of data blocks of an object picture to be coded;

determining means for successively determining, for each selected data block in the group of data blocks, a window of search data from a reference picture based on a corresponding position of the selected data block and the local motion vector which corresponds to the selected data block; and comparing means for successively comparing, for each selected data block in the group of data blocks, the selected data block with the search data from the reference picture in order to determine a motion vector for the selected data block;

wherein the determining means include means for subsequently using the local motion vectors generated from the object picture to determine the window of search data during coding of a successive picture in the sequence of pictures.

* * * * *